UNITED STATES PATENT OFFICE.

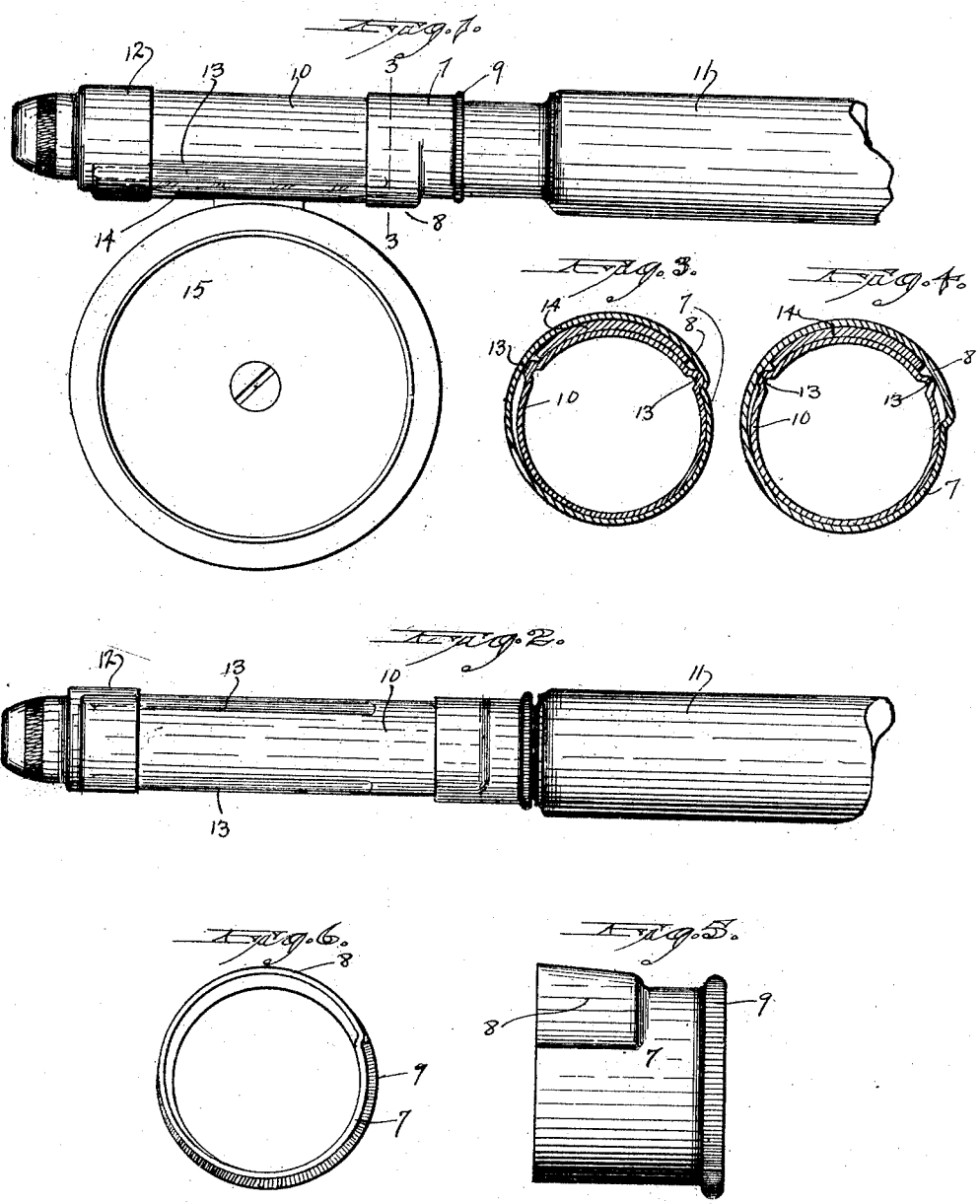

LEAVITT J. LANE, OF NEW HAVEN, CONNECTICUT, ASSIGNOR TO WINCHESTER REPEATING ARMS CO., OF NEW HAVEN, CONNECTICUT, A CORPORATION.

REEL-SEAT.

1,367,272. Specification of Letters Patent. Patented Feb. 1, 1921.

Application filed September 4, 1920. Serial No. 408,256.

*To all whom it may concern:*

Be it known that I, LEAVITT J. LANE, a citizen of the United States, residing at New Haven, in the county of New Haven and State of Connecticut, have invented new and useful Improvements in Reel-Seats; and I do hereby declare the following, when taken in connection with the accompanying drawings and the characters of reference marked thereon, to be a full, clear, and exact description of the same, and which said drawings constitute part of this application, and represent, in—

Figure 1 is a broken view in side elevation of a fishing-rod handle provided with my improved reel-seat and shown as mounting a reel.

Fig. 2 is a broken reverse plan view of the handle with the reel removed.

Fig. 3 is an enlarged view in transverse section on the line 3—3 of Fig. 1, showing the rotatable locking-band in its unlocked position.

Fig. 4 is a similar view on the same line showing the band as turned into its locked position.

Fig. 5 is an enlarged detached view of the rotatable locking-band.

Fig. 6 is a left-hand end view thereof.

My invention relates to an improved reel-band for fishing rods, the object being to produce a simple, convenient and reliable means for attaching the reel securely to the handle of the rod.

With these ends in view my invention consists in a reel-band having certain details of construction as will be hereinafter described and pointed out in the claim.

In carrying out my invention as herein shown, I employ a locking-band 7 formed at its inner end with an integral offsetting cam 8 and at its outer end with a knurled bead 9, the said band being mounted for longitudinal and rotary movement upon the forward portion of the tubular metal reel-seat 10 projecting rearward, in this instance, from the handle 11 of the rod. I also employ a complementary but fixed retaining-collar 12 located at the rear end of the reel-seat 10 so as to overhang the adjacent ends of two parallel positioning-ribs 13 which are struck-up from the lower face of the reel-seat 10 and which are separated from each other by a distance represented by the width of the curved reel-plate 14 of the reel 15 which may, of course, be of any standard construction.

Preparatory to the installation of the reel upon the rod, the locking-band 7 is slid forward as shown in Fig. 2, so as to entirely clear the forward ends of the positioning-ribs 13. The rear end of the reel-plate 14 is then inserted under the forward edge of the fixed retaining-collar so as to lie between the ribs 13. The locking-band 7 is now drawn rearwardly over the forward end of the plate as shown in Fig. 1, whereby the plate is engaged and held by its opposite ends. The band is now rotated from left to right, whereby its cam 8 is caused to ride over the forward end of the reel-plate with the production of sufficient friction to be held securely in place. The band 7 will remain in this position until it is desired to remove the reel from the rod when it is turned from right to left and then slid forward to disengage the forward end of the reel-plate which is then drawn forward and so disengaged from the fixed retaining-collar 12.

I claim:

A reel-seat for fishing-rods, having a tubular reel-seat formed with two parallel positioning-ribs, a fixed retaining-collar overhanging the said ribs at one end thereof, and a longitudinally movable and rotatable band installed upon the tube at the opposite end of the ribs, the said band being formed at its open end with an outwardly offsetting circumferential cam adapted for direct engagement with the outer face of the reel-plate when the reel is installed upon the rod.

In testimony whereof, I have signed this specification in the presence of two subscribing witnesses.

LEAVITT J. LANE.

Witnesses:
ERIK S. PALMER,
A. E. HODGSON.